United States Patent
Cardenas Gasca et al.

(10) Patent No.: US 12,387,254 B2
(45) Date of Patent: Aug. 12, 2025

(54) METHOD, SYSTEM, AND COMPUTER READABLE MEDIUM FOR DISPLAYING VIRTUAL DIGITAL OBJECTS GENERATED USING BLOCKCHAIN TECHNOLOGY

(71) Applicants: Ana Maria Cardenas Gasca, Pasadena, CA (US); Andrés Monroy-Hernández, Seattle, WA (US); Yu Jiang Tham, Seattle, WA (US)

(72) Inventors: Ana Maria Cardenas Gasca, Pasadena, CA (US); Andrés Monroy-Hernández, Seattle, WA (US); Yu Jiang Tham, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 226 days.

(21) Appl. No.: 17/243,783

(22) Filed: Apr. 29, 2021

(65) Prior Publication Data

US 2022/0351279 A1   Nov. 3, 2022

(51) Int. Cl.
G06Q 30/06   (2023.01)
G06Q 20/12   (2012.01)
(Continued)

(52) U.S. Cl.
CPC ....... *G06Q 30/0643* (2013.01); *G06Q 20/123* (2013.01); *G06T 19/006* (2013.01); *H04L 51/52* (2022.05)

(58) Field of Classification Search
CPC ............... G06Q 30/06; G06Q 30/0643
See application file for complete search history.

(56) References Cited

U.S. PATENT DOCUMENTS 6,119,229 A   9/2000   Martinez et al.
11,089,427 B1   8/2021   Canberk et al.
(Continued)

FOREIGN PATENT DOCUMENTS

KR   1020100080862 A   7/2010

OTHER PUBLICATIONS

Trautman, Lawrence J., Virtual Art and Non-fungible Tokens (Apr. 11, 2021). 50 Hofstra Law Review 361 (2022)., Available at SSRN: https://ssrn.com/abstract=3814087 or http://dx.doi.org/10.2139/ssrn.3814087.*

(Continued)

*Primary Examiner* — Jeffrey A. Smith
*Assistant Examiner* — Jennifer V Lee
(74) *Attorney, Agent, or Firm* — CM Law; Stephen J. Weed

(57) ABSTRACT

A system and method for viewing a virtual digital object created from components having cryptocurrency value includes receiving a selection of at least one of an avatar, a captured image of the user or a third party, or a digital scene and receiving a selection of the virtual digital object for display on the selected avatar or captured image or within the digital scene. The virtual digital object includes metadata relating to at least one of cryptocurrency value of the virtual digital object, creation of the virtual digital object, and rules governing use and ownership of the virtual digital object. The user may manipulate the displayed virtual digital object within the display and may elect to display at least part of the metadata (e.g., price) along with the virtual digital object. The display of the virtual digital object may be captured and forwarded via a messaging or social media application.

18 Claims, 14 Drawing Sheets

(51) Int. Cl.
*G06Q 30/0601* (2023.01)
*G06T 19/00* (2011.01)
*H04L 51/52* (2022.01)

(56) References Cited

U.S. PATENT DOCUMENTS

| | | | |
|---|---|---|---|
| 2008/0275789 | A1 | 11/2008 | Ganz et al. |
| 2012/0264520 | A1 | 10/2012 | Marsland et al. |
| 2012/0266256 | A1 | 10/2012 | Kawachiya et al. |
| 2013/0080287 | A1 | 3/2013 | Currie et al. |
| 2016/0026253 | A1* | 1/2016 | Bradski ............... H04N 13/128 345/8 |
| 2016/0358239 | A1 | 12/2016 | Inagaki |
| 2017/0052676 | A1 | 2/2017 | Pulier et al. |
| 2019/0108682 | A1* | 4/2019 | Spivack ............. G06Q 30/0277 |
| 2019/0130701 | A1* | 5/2019 | Simons ................ H04L 9/3239 |
| 2019/0220836 | A1 | 7/2019 | Caldwell |
| 2019/0294721 | A1* | 9/2019 | Keifer ................... G06F 16/282 |
| 2019/0303892 | A1* | 10/2019 | Yantis ................... G06Q 10/10 |
| 2020/0005284 | A1 | 1/2020 | Vijayan |
| 2020/0184041 | A1 | 6/2020 | Andon et al. |
| 2020/0242105 | A1 | 7/2020 | Rich et al. |
| 2022/0270150 | A1 | 8/2022 | Stoyanov |
| 2023/0176828 | A1 | 6/2023 | Ghosh et al. |
| 2023/0245350 | A1 | 8/2023 | Webber et al. |

OTHER PUBLICATIONS

Cannavo, Alberto et al.: "How Blockchain, Virtual Reality and Augmented Reality are Converging, and Why," IEEE Consumer Electronics Magazine, IEEE, Piscataway, NJ, vol. 10, No. 5, Sep. 24, 2020, pp. 6-13.

International Search Report and Written Opinion for International Application No. PCT/US2022/025571, dated Aug. 8, 2022 (Aug. 8, 2022)—9 pages.

International Search Report and Written Opinion for International Application No. PCT/US2022/025734, dated Jul. 27, 2022 (Jul. 27, 2022)—10 pages.

1st European Office Action for EP Application No. 22796412.9 dated Nov. 11, 2024 (Nov. 11, 2024)—11 pages.

* cited by examiner

700

Jake's Gallery

Amulet
1.75 BTC
Metadata

Earring
0.63 BTC
Metadata

⋮

Tara
3.07 BTC
Metadata

Portrait
4.16 BTC
Metadata

Sword
4.16 BTC
Metadata

⋮

METHOD, SYSTEM, AND COMPUTER READABLE MEDIUM FOR DISPLAYING VIRTUAL DIGITAL OBJECTS GENERATED USING BLOCKCHAIN TECHNOLOGY

TECHNICAL FIELD

The present subject matter relates to a system and methods for generating, displaying, and selling virtual digital objects, such as decorative items for use in an augmented reality (AR) environment, using blockchain technology, and, more particularly, to systems and methods for generating and displaying an ecosystem of digital cryptography-based virtual digital objects, such as adornments and art, for acquisition and sharing over social media platforms.

BACKGROUND

Technologies such as non-fungible tokens (NFT) allow individuals to own virtual digital objects. Digital artists may generate art in a digital media and tie the art to digital tokens that can be bought, sold, and traded to enable the artist to profit from her artwork. The NFTs are, in essence, computer files that are combined with proof of ownership and authenticity for the digital artwork generated by the digital artist. Artists who wish to sell their work as NFTs sign up with an NFT marketplace such as Nifty Gateway, OpenSea or SuperRare, then mint digital tokens by uploading and validating their information on a blockchain such as the Ethereum blockchain. The NFTs may then be listed for auction on the NFT marketplace. However, unlike jewelry or other items that may be purchased in the "real" world, conventional virtual digital objects such as NFTs may not be acquired and worn or used to decorate an individual's virtual environment to, for example, enhance an individual's AR representation. Thus, NFTs are not truly analogous to their real-world counterparts.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
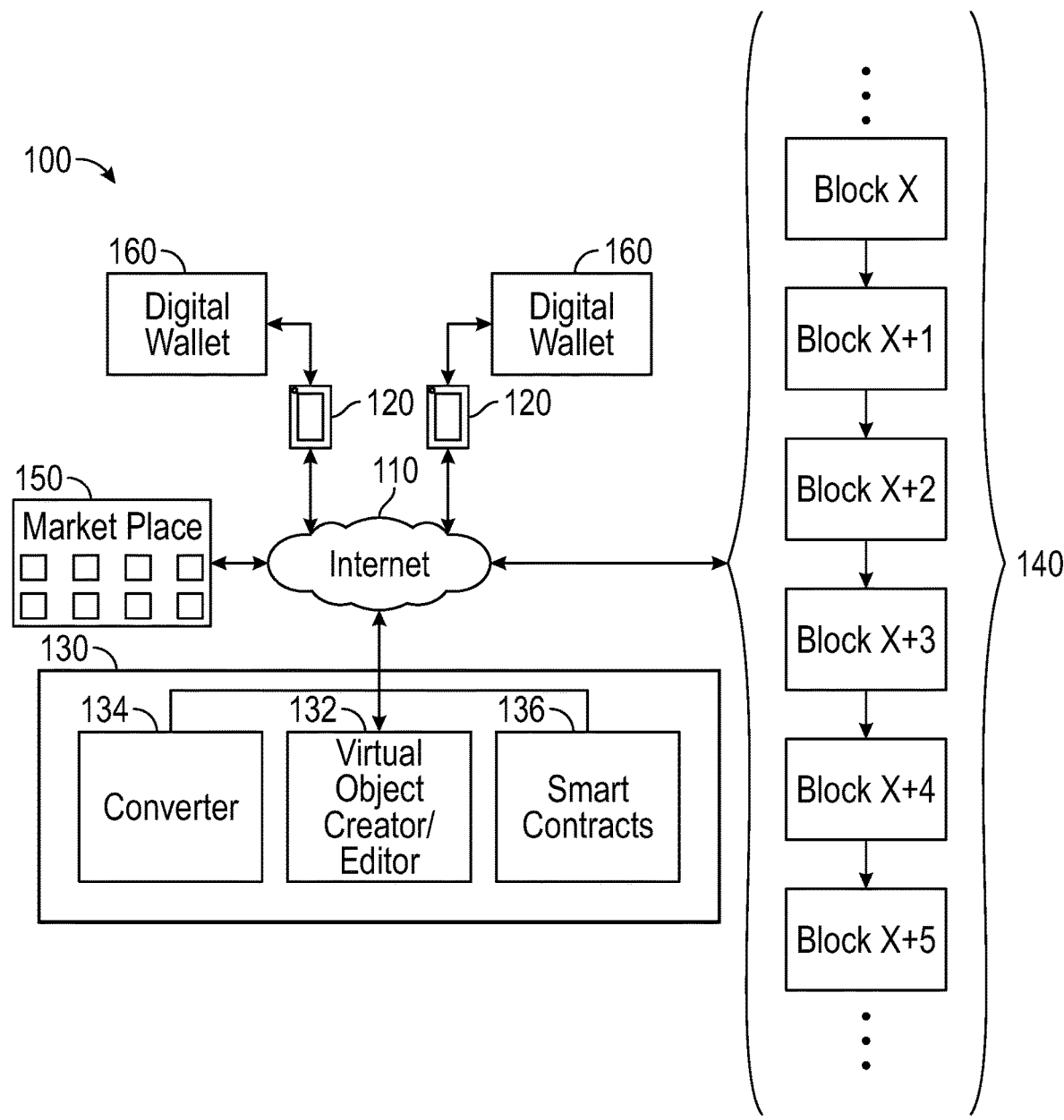
FIG. 1 illustrates a system for generating, displaying, and selling virtual digital objects using blockchain technology in a sample configuration.

The systems and methods described herein enable the generation of an ecosystem of digital cryptography-based virtual digital objects or augmented reality (AR) objects, such as adornments and art, for acquisition and sharing over social media platforms. In sample configurations, users use an editing tool (e.g., a modified version of the Lens Studio by Snap, Inc.) to build virtual digital objects such as digital jewelry objects that can augment and adorn the bodies of the user or other users or the user's digital (e.g., augmented reality) environment (e.g., virtual earrings, necklaces, shoes, sculptures, paintings, etc.). Users of the system may browse through lists of virtual digital objects owned by their friends on social media platforms or browse through virtual digital objects available for purchase on a marketplace organized by metadata.

The systems and methods described herein enable the generation and display of virtual digital objects that are both valuable and meaningful because of the capability of the aesthetic characteristics of the virtual digital objects to enhance user's AR or social media representation. The system and methods thus enable the age-old concept of grandma's ring or necklace that is passed from generation to generation that is both valuable (e.g., made of precious metals) and meaningful (e.g., linked to who has worn it and how it looks) to be preserved in the digital environment. The virtual digital object may be generated and purchased using cryptocurrency.

The system and method described herein enable the creation and display of a virtual digital object comprising a plurality of components. During creation of the virtual digital object, the system receives from a user selections of a plurality of components for use in creating the virtual digital object. Each component has a cost designated in cryptocurrency that is presented for acceptance by the user. Upon acceptance, a cost tally for the virtual digital object is updated. Upon completion, the virtual digital object is minted by subtracting a total cost tally, plus network fees, in cryptocurrency from a digital wallet of the user and by interacting with a smart contract including the virtual digital object and metadata relating to at least one of valuation of the virtual digital object, creation of the virtual digital object, and rules governing use and ownership of the virtual digital object. The minted virtual digital object is added to the user's digital wallet and optionally uploaded to an online gallery for purchase. The virtual digital object is viewed by receiving a selection of at least one of an avatar, a captured image of the user or a third party, or a digital scene and receiving a selection of the virtual digital object for display on the selected avatar or captured image or within the digital scene. The user may manipulate the displayed virtual digital object within the display and may elect to display at least part of the metadata (e.g., price) along with the displayed virtual digital object. The resulting display of the virtual digital object may be captured and forwarded via a messaging or social media application.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1 illustrates a system 100 for generating, displaying, and selling virtual digital objects using blockchain technology in a sample configuration. In the system 100 shown in FIG. 1, individuals may access the internet 110 using their client devices 120, which may be a smart phone, a laptop, a desktop, or any other computing device that enables communications via the internet 110. The client devices 120 enable users to access a server computer 130 that includes a virtual object creator/editor 132 (e.g., a modified version of Lens Studio by Snap, Inc.) that enables the user to build virtual adornments or other items that can augment and adorn avatars or other AR representations of the users or their digital environment. For example, the virtual digital objects generated by the virtual object creator/editor 132 may include virtual earrings, necklaces, rings, shoes, clothes, sculptures, paintings, and other forms of art that may be displayed on a live camera view of a user, on an avatar, or in an augmented reality or other digital setting.

In sample configurations, the virtual digital objects generated using the virtual object creator/editor 132 may be virtual digital objects or augmented reality objects used to adorn avatars or augmented reality images, to enhance augmented reality images, or for use in digital scenes such as in video games. In such sample configurations, the virtual digital objects have real-world monetary value that is represented in cryptocurrency stored on the blockchain 140. For example, each voxel in a virtual digital object may be mapped by cryptoconverter 134 to a cryptocurrency value (e.g., 0.001 BTC including any network fees such as Gas in Ethereum) that the artist had to spend to generate the virtual digital object. The value of the virtual digital object also can be derived from the last traded price or other measures of value.

Users may authenticate their identity when using the virtual object creator/editor 132 such that a virtual digital object generated by the user comes with metadata about the user and the process of generating the virtual digital object. For example, the metadata may list at least one of the user's verified name, the number of hours spent in the making of the virtual digital object, or at least one of the online or geographic location where the user was during the generation process. It will be appreciated that providing asset metadata allows platform applications like OpenSea to pull in data for digital assets for display within an app on the user's client device 120. Such digital assets on a given smart contract 136 may be represented solely by a unique identifier, and the metadata allows these digital assets to have additional properties, such as a name, description, and image. For example, the smart contract 136 may return a uniform resource identifier for a given token ID where the metadata associated with the virtual digital object can be found. The metadata also may be in the form of multimedia attachments, including audio, video, and 3D models, plus interactive traits and other attributes or traits (e.g., numeric or date) for the virtual digital objects, as appropriate.

Users of the system described herein may browse through lists of virtual digital objects that they own and may also use social media platforms to browse through lists of virtual digital objects owned by their friends (assuming proper permissions). Also, users may search marketplace 150 for virtual digital objects that are available for sale and organized by metadata (e.g., object creator, price, etc.). The marketplace 150 may include, for example, a merchandise store for users in virtual environments where points earned while gaming may be used to purchase virtual digital objects. On the other hand, the marketplace 150 may be a standalone digital art store or digital jewelry store for a digital or augmented reality environment. The users may purchase virtual digital objects available on the marketplace 150 using cryptocurrency from the user's digital wallet 160. Users also may show the virtual digital objects the user owns or has borrowed from another user through an augmented reality (AR) camera (e.g., Snapchat or Snap Camera) during video calls or as they capture live pictures or videos with an AR camera when they are authenticated as owners of a cryptocurrency wallet where the virtual digital objects are stored or are verified as a user authorized to borrow a virtual digital object from another user to preview. Similarly, a user may be granted such preview authorization before purchasing a virtual digital item from the marketplace 150. The AR cameras (e.g., Snapchat camera) and AR viewer (e.g., Snapchat's My Story viewer) may use a plug-in to authenticate the ownership of the virtual digital object during or after capturing visual content of the user. Some virtual digital objects also may be configured to appear in the AR cameras only under specific constraints specified by at least one of the creator or the owner of the virtual digital object. For example, the display of a particular virtual digital object may be permitted only on a particular pre-registered face or location, as specified in the metadata of the virtual digital object or in a smart contract 136 governing the use and purchase of the virtual digital object in question.

The virtual object creator/editor 132 is an authoring tool that users may use to design virtual digital objects using "raw" components with value stored on the blockchain 140. The virtual object creator/editor 132 also records time spent making a virtual digital object and other metadata about the user and the user's environment. This metadata may incorporate the value of a particular creator in the marketplace. For example, a well-known creator spending a significant amount of time making a virtual digital object is likely more valuable than a lesser known creator spending the same amount of time. Users also may set constraints for whom and in which circumstances virtual digital object designed and generated by that user might be rendered. For example, a virtual digital object designed by the user might be tied to the face of the owner by an AR camera, or the virtual digital object might be used only in specific online or real-world geographies.

The cryptoconverter 134 connects the virtual object creator/editor 132 and a viewer of an application program loaded onto the user's device 120 with the user's cryptocurrency digital wallet 160 to identify a section of the blockchain 140 and to translate the blockchain section into components that users can see, hear, and eventually touch, taste, or smell. Multiple cryptoconverters 134 may be used, each with different ways of interpreting the blockchain 140. Each cryptoconverter 134 may map, for example, a portion of bitcoin (e.g., 0.001 BTC), a portion of Ether, or other cryptocurrency into a component (voxel) of the virtual digital object, into a portion (e.g., milliseconds) of a sound wave, or into a set number of operations (e.g., $1 \times 10^6$ operations) to encode characteristics of a virtual digital object (e.g., the way virtual jewelry generated using the virtual object creator/editor 132 responds to touch, etc.). The value assigned to the virtual digital object so generated may be established using one or more smart contracts 136.

The virtual digital object marketplace 150 may be an online space that lists virtual digital objects and their raw value (based on materials used in creating the virtual digital object) and market value based on the fame of the creator and other subjective assessments, all of which may be set forth in the metadata associated with each virtual digital object. The marketplace 150 allows users to view, buy, or gift a virtual digital object by transferring crypto funds from the user's digital wallet in return for transfer of the selected virtual digital object to the user's digital wallet.

An application program running on the user's client device 120 may include a verified AR renderer component that may be used by AR cameras (e.g., Snapchat camera) to convert what is stored on the blockchain 140 and supplementary storage units into visual/audio/etc. representations that appear on the AR camera feed. Also, the AR camera may show a "verification" badge to vouch for the authenticity of the virtual digital object as represented by the metadata.

The application program running on the user's client device 120 may also include a graph application programming interface (API) that, given a unique identifier of a user or a user's social media friend, returns a list of virtual digital objects owned by that user or the user's social media friend. The graph API may be used by social media platforms or other software to render the virtual digital objects in individual's avatars (e.g., a Bitmoji sticker showing a verified necklace) or in a digital scene, such as in a video game.

It will be appreciated by those skilled in the art that the user's device 120, server computer 130, blockchain 140, and virtual digital object marketplace 150 need not be owned or operated by the same entity. For example, the server computer 130 and the virtual object creator/editor 132 and a social media application running on the user's device 120 may be owned and operated by one entity, while the virtual digital object marketplace 150 may be owned and operated by the same or a separate entity. Also, the blockchain 140 may be a public blockchain or a private blockchain operated by an authentication entity, which may be the same or different from the entities operating the virtual object creator/editor 132 and the virtual digital object marketplace 150.

Figure 2:
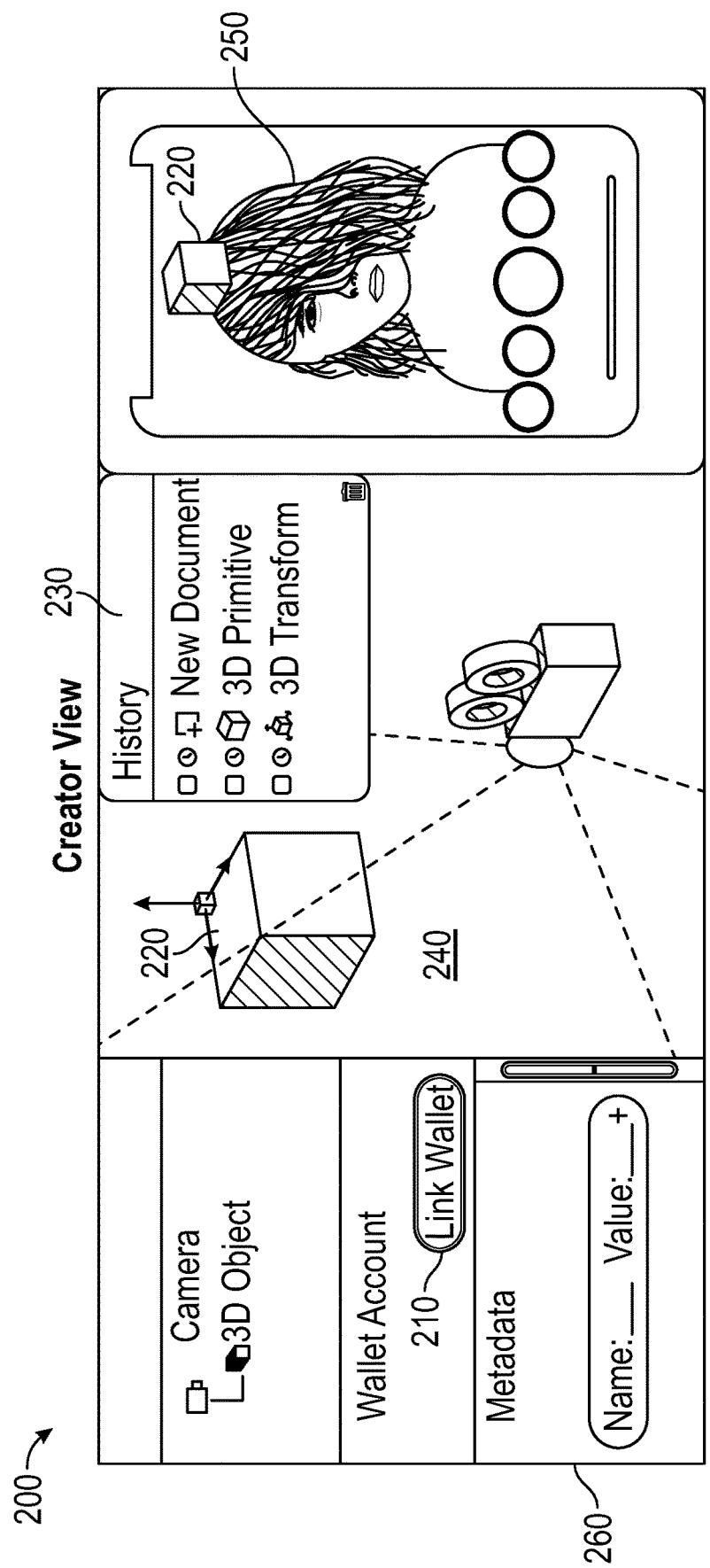
FIG. 2 illustrates the generation of a virtual digital object in a sample configuration.

FIG. 2 illustrates the generation of a virtual digital object in a sample configuration. The "creator view" 200 shown in FIG. 2 illustrates the view that may be provided to the user's application program on the user's client device 120 when interacting with the virtual object creator/editor 132. In this example, a user is enabled to link the user's digital wallet 160 at 210 to the virtual object creator/editor 132 for funding of the creation of virtual digital objects. During creation of a virtual digital object, the user may select a component 220 (e.g., a new document, a 3D primitive, or a 3D transform representative of an item, a sound, a behavior, or other digital component for a virtual digital object) for creating the virtual digital object and display the virtual digital object on at least one of a display 240 or an image 250 from an AR camera. Metadata 260 such as user's digital wallet address, as well as other optional information such as location, may be saved to provide context and as proof of authenticity of the virtual digital object designed by the user.

When the user has finished designing a virtual digital object, the user may pay the fee to the virtual object creator/editor 132 to have the designed virtual digital object minted and added to the user's digital wallet 160. It is noted that the fee paid by the user may include network fees, such as Gas in Ethereum. A history 230 of the user's actions in designing and generating the minted virtual digital object may be stored as metadata 260. Also, the user may go backwards or forwards in their series of actions to regenerate/modify the virtual digital object as it is being generated. Once the designed virtual digital object has been minted and added to the user's digital wallet 160, the designed virtual digital object is also added to the blockchain 140 along with the associated metadata 260.

Figure 3:
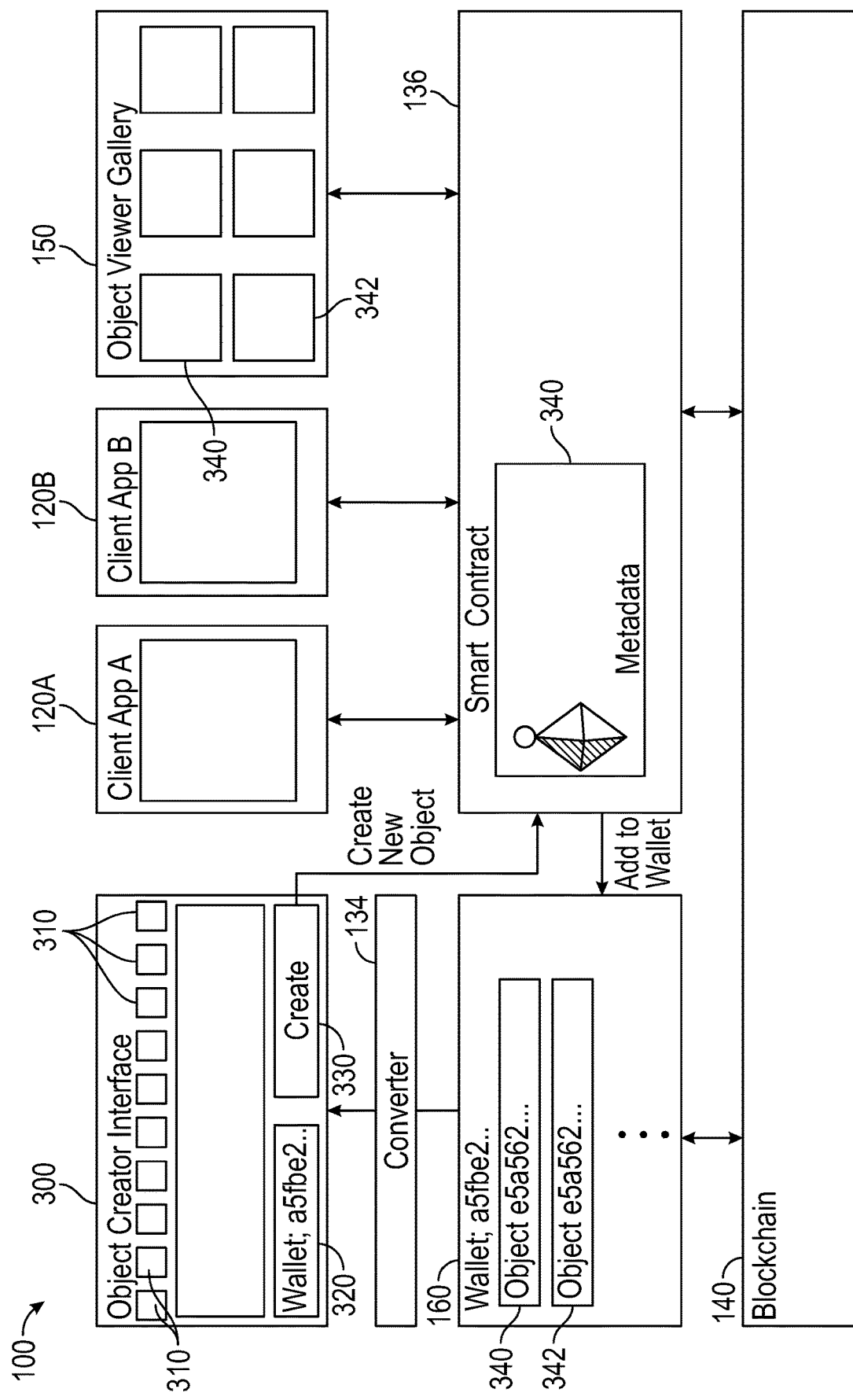
FIG. 3 illustrates a functional block overview of the system of FIG. 1 for generating a new virtual digital object in a sample configuration.

FIG. 3 illustrates a functional block overview of the system 100 of FIG. 1 for generating a new virtual digital object in a sample configuration. In this configuration, the user interacts with the virtual object creator/editor 132 via an object creator interface 300 including components 310 that the user may combine into a new virtual digital object. In sample configurations, a cost may be associated with each component 310. The cost as represented in cryptocurrency stored on the blockchain 140 is tallied for selected components 310 in a digital wallet 320 within the virtual object creator/editor 132, and each component 310 is mapped by cryptoconverter 134 to a cryptocurrency value. The user's digital wallet 160 is charged for each component 310 used in designing the new virtual digital object when the user hits the "create" button 330 to mint the new virtual digital object. The minted virtual digital object 340 and its associated metadata is assigned to a smart contract 136 that is interacted with when the virtual digital object 340 is minted and added to the user's digital wallet 160.

The new virtual digital object 340 may be accessed by a client app 120A of the user or client app 120B of another user for display with the user's image as taken by an AR camera or may be accessed by a graph API of the user's client app 120A or the other user's client app 120B to return a listing of the virtual digital objects 340 or 342 owned by that user and stored in the user's digital wallet 160. Social media apps such as those available from Snap, Inc. or Instagram may be adapted for such applications. Alternatively, when the new virtual digital object 340 or 342 has been listed in the marketplace 150 for purchase, the client apps 120A or 120B may interact with the corresponding smart contract 136 to identify the characteristics that must be satisfied to access, use, and potentially purchase the new virtual digital object 340 or 342 from the marketplace 150.

Figure 4:
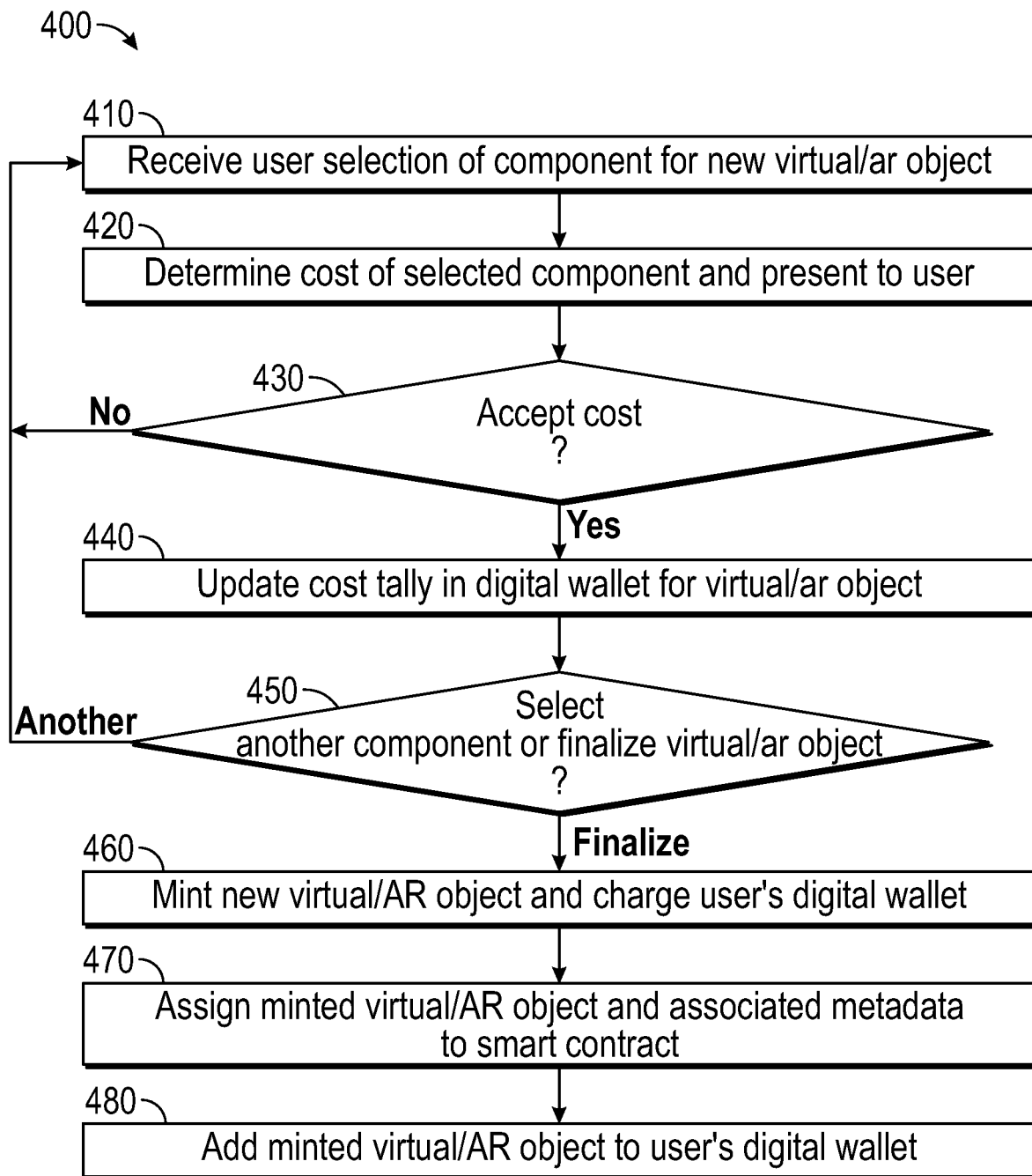
FIG. 4 illustrates a flow chart for generating a new virtual digital object in a sample configuration.

FIG. 4 illustrates a flow chart 400 of the steps implemented by the virtual object creator/editor 132 for generating a new virtual digital object in a sample configuration. As noted above with respect to FIG. 3, the user interacts with the virtual object creator/editor 132 via the object creator interface 300 to select a component 310. The selection is received at 410 for inclusion in a new virtual digital object. At 420, the cost of the selected component is determined by the cryptoconverter 134 and presented to the user. If the user accepts the cost at 430, the digital tally for the cost of the new virtual digital object is updated at 440. Otherwise, the user is given the option to select another component or to abort the creation of a new virtual digital object, and the process is restarted at 410. At 450, the user is given the option of selecting another component at 410 or finalizing the new virtual digital object by minting the new virtual digital object and charging the user's digital wallet for the total cost for components parts of the new virtual digital object at 460 (including any network fees). The minted virtual digital object and its associated metadata is assigned to a smart contract 136 that is interacted with when the virtual digital object is minted at 470 and added to the user's digital wallet 160 at 480. It will be understood that the process of selecting components may be repeated a number of times over one or more sessions until the user is ready to mint the new virtual digital object. As noted above, these components may be a new document, a 3D primitive, a 3D transform representative of an item, a sound, or other digital component for a virtual digital object.

As noted above, the new virtual digital object may be accessed by a client app 120A of the user or client app 120B of another user for display with the user's image as taken by an AR camera or may be accessed by a graph API of the user's client app 120A or the other user's client app 120B to return a listing of the virtual digital objects owned by that user and stored in the user's digital wallet 160. In sample configurations, the client apps 120A and 120B are implemented on user smartphones 120. A sample configuration of such a user smartphone 120 is illustrated in FIG. 5.

Figure 5:
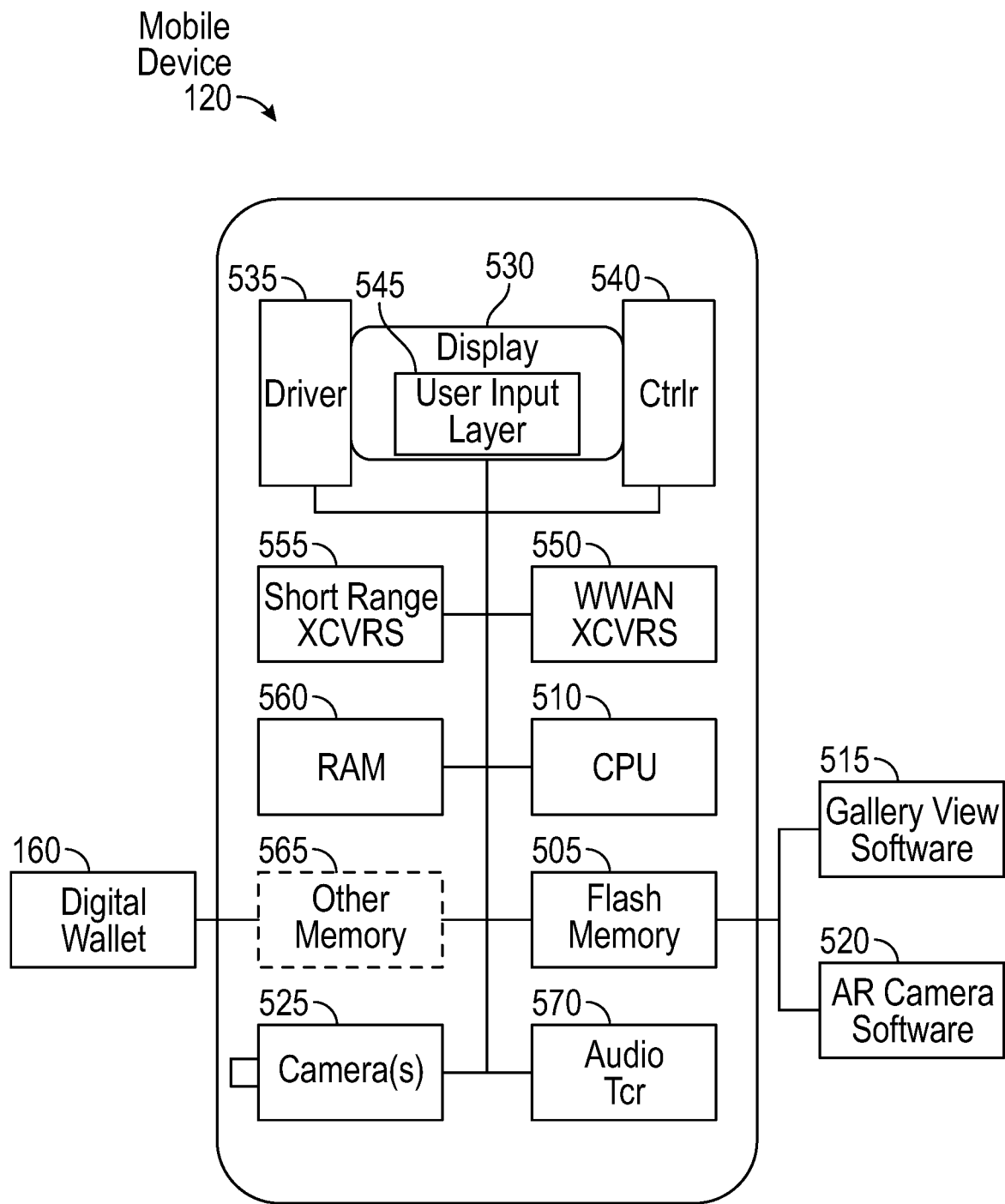
FIG. 5 illustrates a sample configuration of a mobile phone adapted for use with a system for generating, displaying, and selling virtual digital objects using blockchain technology in a sample configuration.

FIG. 5 illustrates a sample configuration of a mobile phone adapted for use with a system for generating, displaying, and selling virtual digital objects using blockchain technology in a sample configuration. In particular, FIG. 5 is a high-level functional block diagram of an example mobile device that a user may use as the client device 120. Mobile device 120 may include a flash memory 505 that stores programming to be executed by the CPU 510 to perform all or a subset of the functions described herein. For example, the flash memory may store gallery view software 515 and AR camera software 520 for execution by CPU 510 to enable the user of the mobile device 120 to view and manipulate the virtual digital objects. The mobile device 120 may further include a camera 525 that comprises one or more visible-light cameras (first and second visible-light cameras with overlapping fields of view) or at least one visible-light camera and a depth sensor with substantially overlapping fields of view. Flash memory 505 may further include multiple images or video, which are generated via the camera 525.

The mobile device 120 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 120 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 120 includes at least one digital transceiver (XCVR) 550, shown as WWAN (Wireless Wide Area Network) XCVRs, for digital wireless communications via a wide-area wireless mobile communication network. The mobile device 120 also may include additional digital or analog transceivers, such as short-range transceivers (XCVRs) 555 for short-range network communication, such as via NFC, VLC, DECT, ZigBee, Bluetooth™, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 120, the mobile device 120 also may include a global positioning system (GPS) receiver. Alternatively, or additionally, the mobile device 120 may utilize either or both the short range XCVRs 555 and WWAN XCVRs 550 for generating location coordinates for positioning. For example, cellular network, WI-FI®, or Bluetooth™ based positioning systems may generate very accurate location coordinates, particularly when used in combination. Such location coordinates may be transmitted to the mobile device 120 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 120.

The mobile device 120 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smartphone, laptop computer, and tablet.

The CPU 510 serves as a programmable host controller for the mobile device 120 by configuring the mobile device 120 to perform various operations, for example, in accordance with instructions or programming executable by CPU 510. For example, such operations may include various general operations of the mobile device 120, as well as operations related to the programming for applications such as client apps 120A or 120B on the mobile device 120. Although a processor may be configured by use of hardwired logic, typical processors in mobile devices are general processing circuits configured by execution of programming.

The mobile device 120 further includes a memory or storage system, for storing programming and data. In the example shown in FIG. 5, the memory system may include flash memory 505, a random-access memory (RAM) 560, and other memory components 565, as needed. As illustrated, such memory components 565 may store the user's digital wallet 160, for example. The RAM 560 may serve as short-term storage for instructions and data being handled by the CPU 510, e.g., as a working data processing memory. The flash memory 505 typically provides longer-term storage.

Hence, in the example of mobile device 120, the flash memory 505 may be used to store programming or instructions for execution by the CPU 510. Depending on the type of device, the mobile device 120 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

Finally, the mobile device 120 may include an audio transceiver 570 that may receive audio signals from the environment via a microphone (not shown) and provide audio output via a speaker (not shown). Audio signals may be coupled with video signals and other messages by a messaging application or social media application implemented on the mobile device 120.

Figure 6:
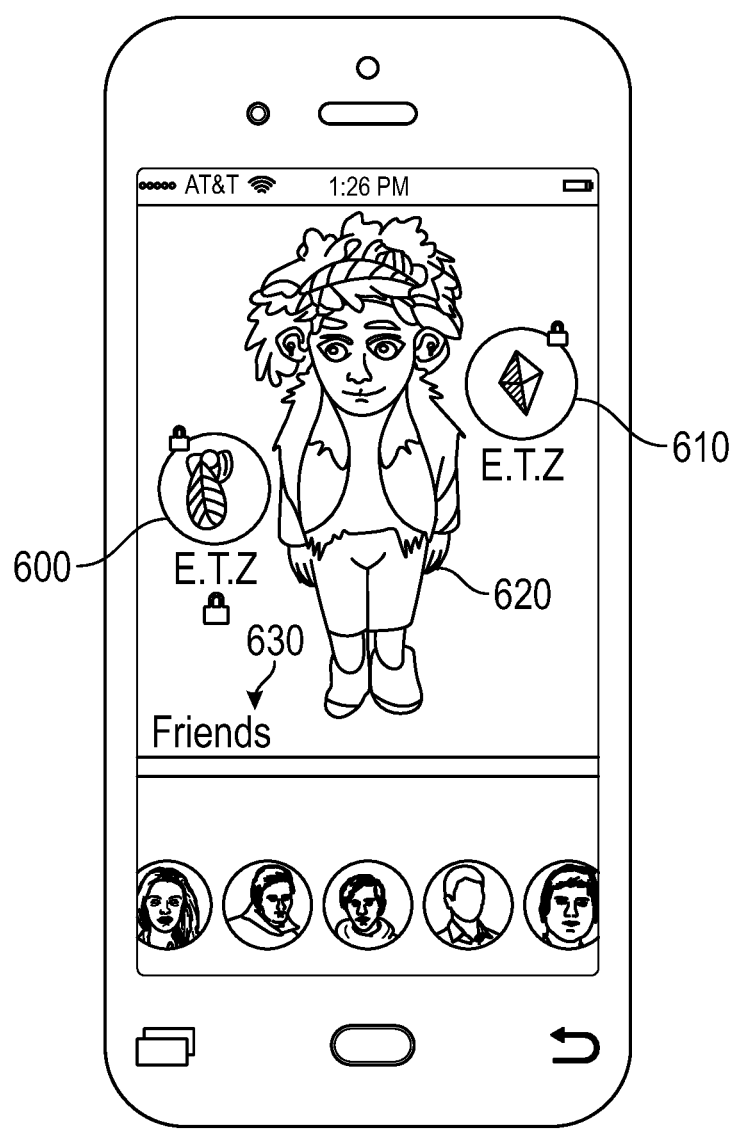
FIG. 6 illustrates a view of a client application on a user's mobile phone that enables the user to see the user's digital jewelry objects or the digital jewelry objects of a friend on the user's image or avatar.

FIG. 6 illustrates a view of a client application 120A on a user's mobile phone 120 that enables the user to see virtual digital objects such as the user's digital jewelry objects 600 or the digital jewelry objects 610 of a friend on the user's image or avatar 620. In this example, the user either selects the user's avatar or uses the AR camera of the user's mobile phone 120 to generate the user's live image or avatar 620. On the other hand, the digital jewelry objects 600/610 may be selected by selecting the user's gallery or by selecting a social media friend 630. Upon selection of the user or a friend, graph API software of the client application 120A may generate a listing of virtual digital objects 700 (FIG. 7) owned by the selected user or social media friend. One or more of the virtual digital objects 700 that are digital jewelry objects may be selected for adornment of the user's live image or avatar 620.

Figure 7:
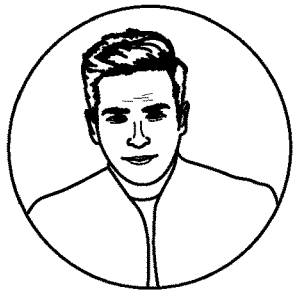
FIG. 7 illustrates a sample virtual digital object gallery of the user's friend as displayed by the client application on the user's mobile phone.
Figure 7:
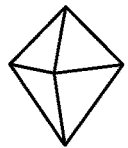
Figure 7:
Figure 7:
Figure 7:
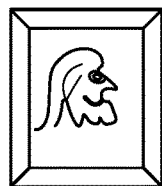
Figure 7:
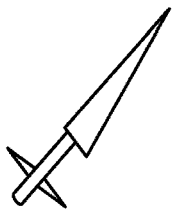

Thus, the client application 120A, 120B may have a Friend View that allows a user to see the virtual digital objects such as digital jewelry objects 700 that their friends own. For example, FIG. 7 illustrates a sample virtual digital object gallery of the user's social media friend (Jake) as displayed by the client application 120A on the user's mobile phone 120 (assuming Jake provided permissions to access his virtual digital object gallery to the user). When selected for display on the user's image or avatar 620, each piece of digital jewelry 600, 610 is highlighted on the person as a virtual digital object, and the metadata for the selected virtual digital object may be displayed. For example, the value of each item 600, 610 and other information about the item 600, 610 available in the metadata (such as when and where generated and by whom) may be obtained by touching, tapping, or mousing over the item 600, 610.

Figure 8B:
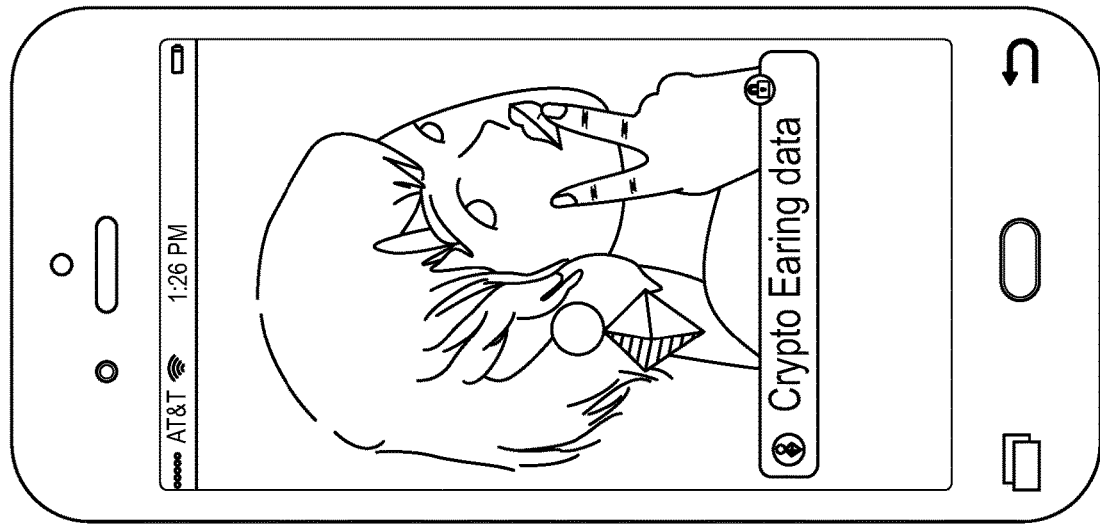
FIG. 8B illustrates a live camera view of the user wearing the digital jewelry object as in FIG. 8A where the user has tapped on the digital jewelry object to see additional details about the digital jewelry object as obtained from the digital jewelry object's metadata.
Figure 8A:
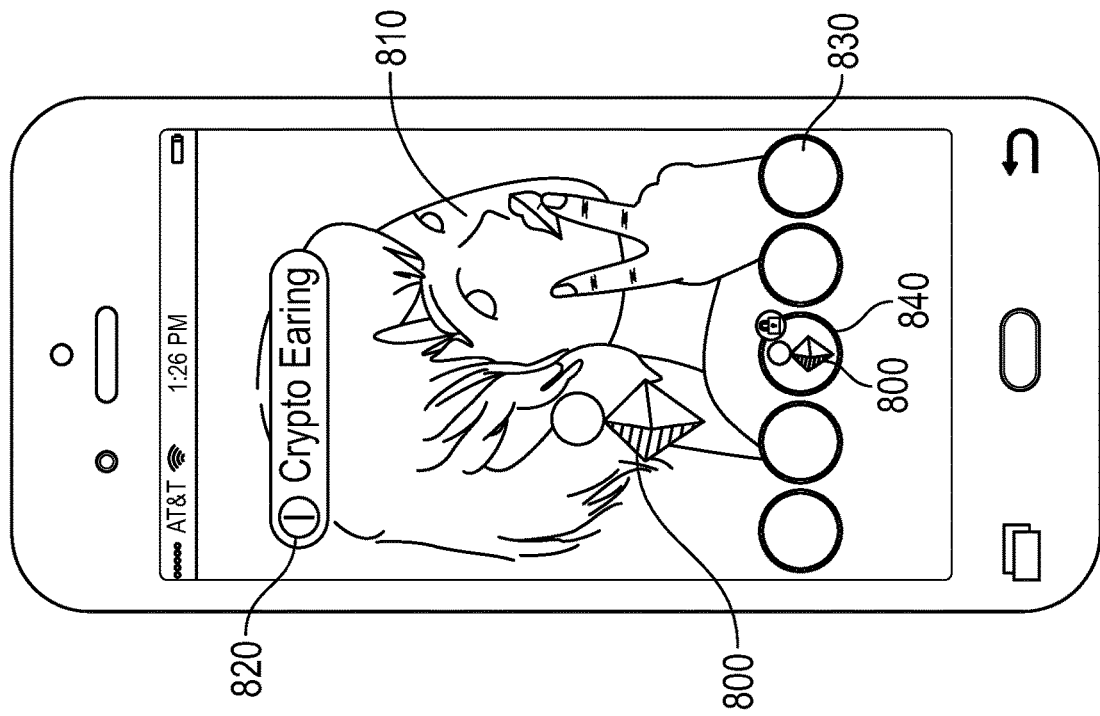
FIG. 8A illustrates a live camera view of a user wearing a digital jewelry object as displayed by the client application on the user's mobile phone.

FIG. 8A illustrates a live camera view of a user wearing a digital jewelry object 800 as displayed by the client application 120A on the user's mobile phone 120. In this example, the user's AR camera presents live image 810 of the user with the digital jewelry object 800 placed on the user's ear for modeling as illustrated. Using the AR camera, the digital jewelry object 800 may be applied as a filter that follows the user's ear in the image 810. As in FIG. 6, metadata 820 about the digital jewelry object 800 may be obtained and displayed by touching, tapping, or mousing over the digital jewelry object 800. FIG. 8B illustrates a live camera view of the user wearing the digital jewelry object 800 where the user has tapped on the digital jewelry object 800 to see additional details about the digital jewelry object 800 as obtained from the digital jewelry object's metadata 820. In sample configurations, the metadata may highlight the creation process for the digital jewelry object 800. The user may scroll through different digital jewelry objects 800 within the user's or a friend's gallery 830 of digital jewelry objects 800.

Figure 9:
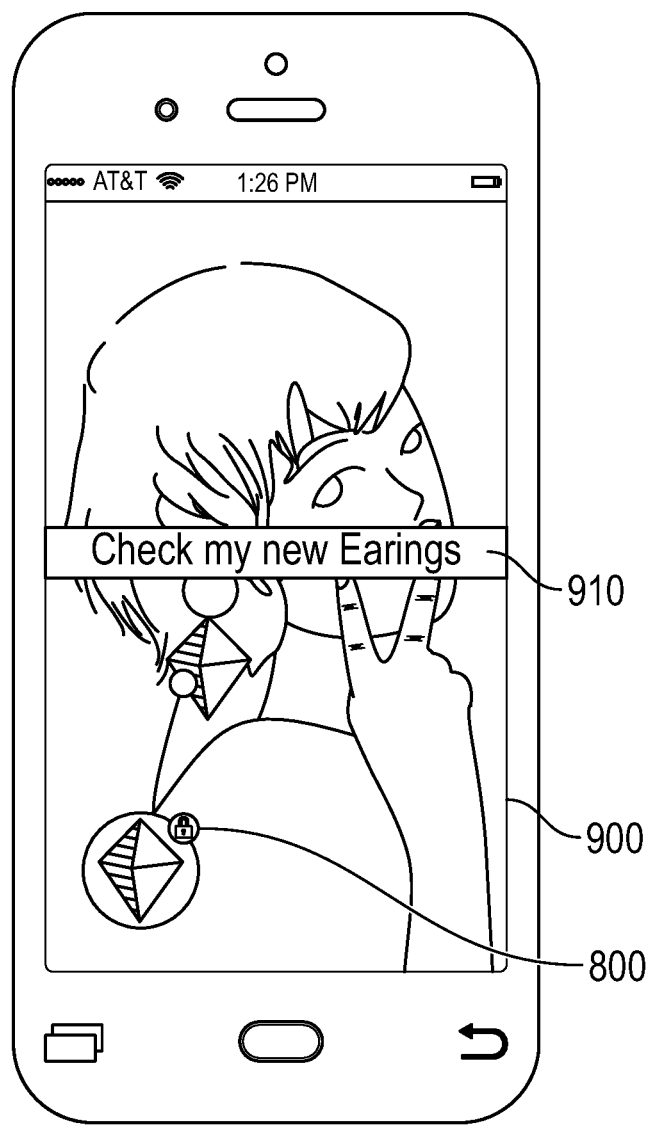
FIG. 9 illustrates a capture view of the live camera view of FIG. 8A where the user has captured a still image or video image of the user wearing the digital jewelry object to send to a friend via the messaging service associated with the client application on the user's mobile phone.

In addition to displaying the selected digital jewelry object 800 in a live camera view presented by the client application 120A, 120B, the user may capture her image 810 including the selected digital jewelry object 800 by pressing the capture button 840 (FIG. 8A) to capture the user's image 810 adorned with the digital jewelry object 800. As illustrated in FIG. 9, a capture view 900 of the live camera view of FIG. 8A may enable the user to provide a still image or a video image of the user wearing the digital jewelry object 800 to send to a friend via a messaging or social media service associated with the client application 120A on the user's mobile phone 120. For example, the user may implement a messaging service of the type provided by Snap, Inc. to send the captured view 900 to a friend, thus enabling the respective users to share their adorned images. The user may also include a typed or audio message 910 with the captured view 900 for sharing with a friend. As further illustrated in FIG. 9, the user may tap the screen at 800 or add a separate point on the screen to see the information describing the crypto jewelry on the photo.

In sample configurations, client applications can potentially implement co-located augmentation scenarios. On a co-located scenario, third parties can augment the owner of crypto jewelry with the augmented reality content. Authentication scenarios may vary depending on the client application. In the case of a client application like Snapchat, for example, a lens may be shared amongst friends or contacts in the platform. Other platforms may implement face recognition mechanisms or broadcast user IDs across a shared augmented reality session.

Figure 10:
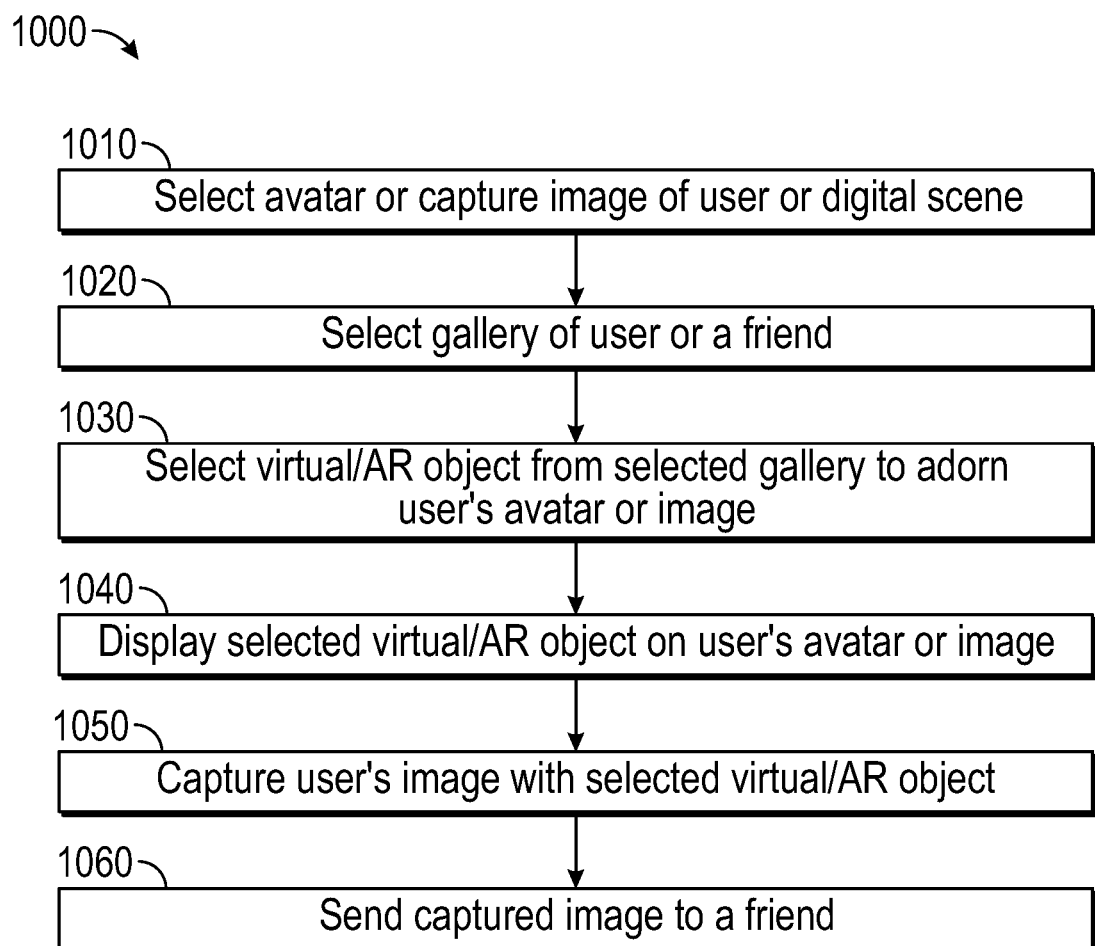
FIG. 10 illustrates a flow chart for viewing a virtual digital object via the client application on the user's mobile phone.

FIG. 10 illustrates a flow chart 1000 for viewing a virtual digital object via the client application 120A, 120B on the user's mobile phone 120. The client app 120A, 120B enables the user to select the user's avatar or to use the AR camera of the user's mobile phone 120 to generate the user's live image or avatar or a digital scene at 1010. On the other hand, the image may be pulled from a digital photo gallery or may be a live image of a third party. The user selects the user's gallery or the gallery of a friend at 1020. Upon selection of the user or a friend, graph API software of the client application 120A may generate a listing of virtual digital objects 700 that the user may scroll through for selection by the user at 1030. The displayed image may also include metadata of the selected virtual digital object as described above with respect to FIGS. 8A-8B. One or more of listed virtual digital objects 700 that are selected at 1030 may be displayed at 1040 for adornment of the user's image or avatar. Also, the user may capture her image as adorned with the virtual digital object at 1050 and optionally transmit the captured image to a friend using a messaging or social media application at 1060.

It will be appreciated that when the virtual digital object is not a virtual digital object to be used to adorn the user that the virtual digital object may instead be placed within the captured image as appropriate. For example, if the virtual digital object is a painting, sculpture, document, diploma, etc. that is to be placed in the user's digital or AR environment, the virtual digital object may be placed in the live image generated by the user's AR camera or in the image view adjacent the user's avatar.

Figure 11A:
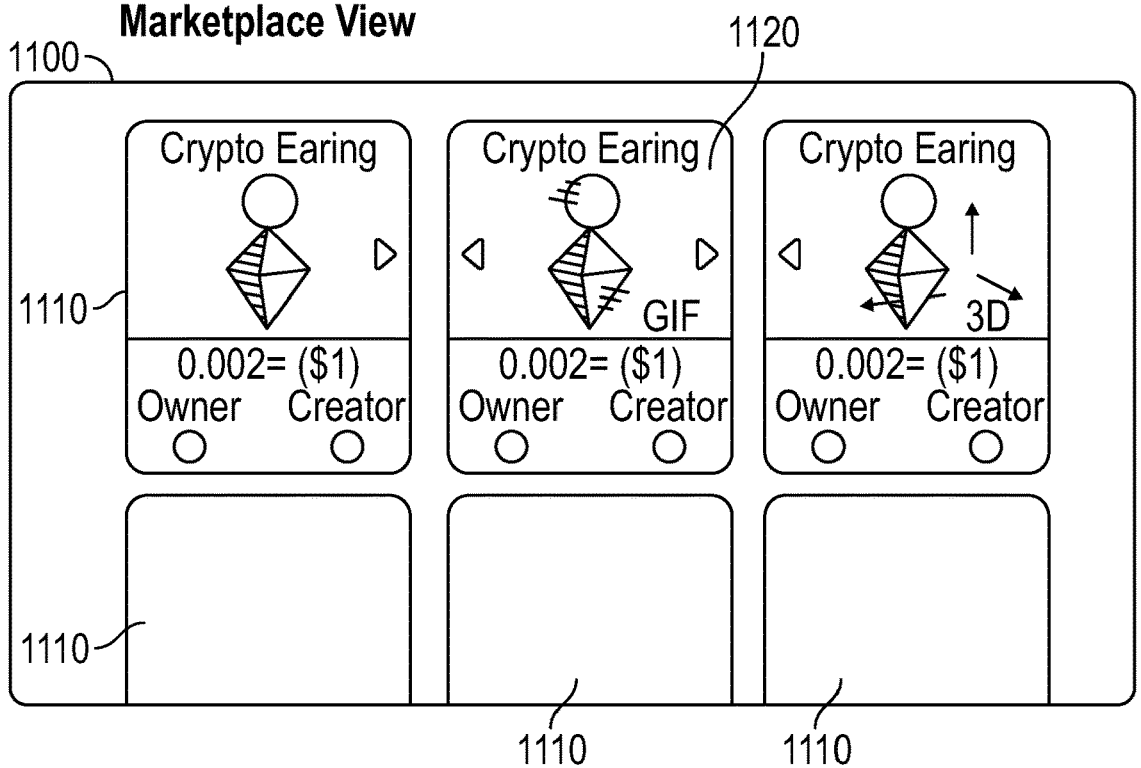
FIG. 11A illustrates a sample marketplace view showing virtual digital objects available to purchase via gallery view software of the user's mobile phone.
Figure 11B:
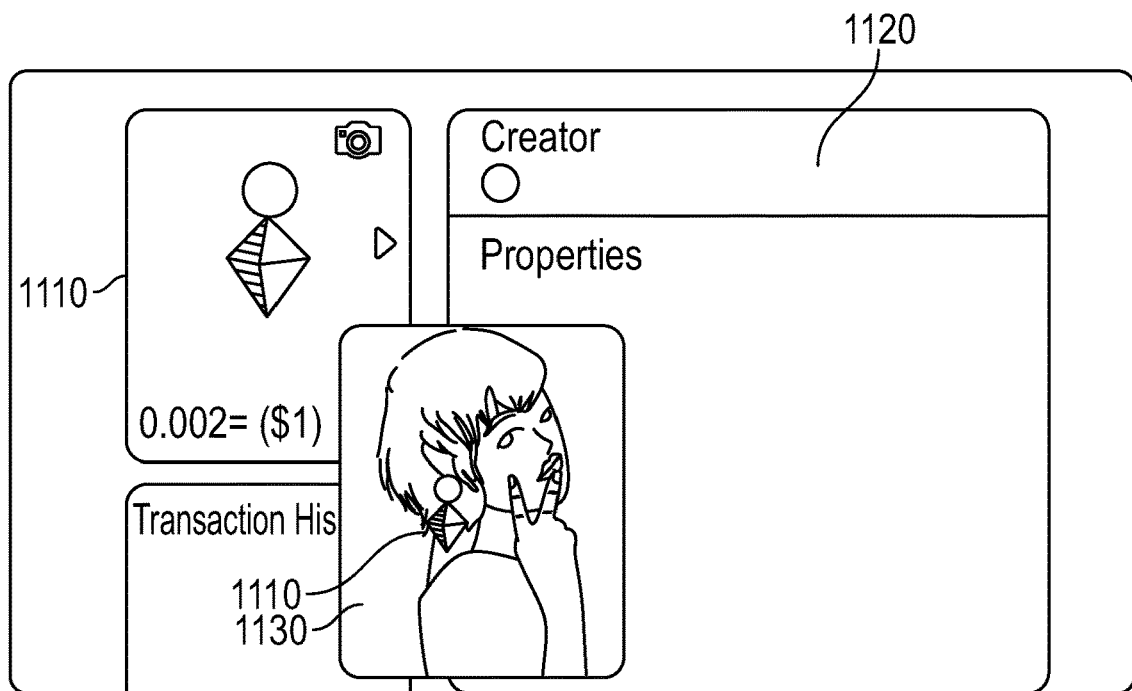
FIG. 11B illustrates that the viewer may preview the selected virtual digital object for viewing on the viewer's avatar or live camera view image before purchasing the virtual digital object.

FIG. 11A illustrates a sample marketplace view 1100 showing virtual digital objects 1110 available to purchase via gallery view software of the user's mobile phone 120. As noted above, the marketplace 150 may be used by owners of virtual digital objects to post their virtual digital objects for purchase with their prices. For example, as shown in FIG. 11A, the price, owner, and creator of the selected virtual digital object 1110 may be obtained from the metadata and displayed at 1120 for viewing by a potential purchaser. The gallery view software also may enable the user to manipulate three-dimensional virtual digital objects to view each side of the virtual digital objects. If the viewer wishes to acquire the viewed virtual digital object, transfer of ownership is completed via interaction with the associated smart contract 136. Also, as illustrated in FIG. 11B, the viewer may preview the selected virtual digital object 1110 for viewing on the viewer's avatar or live AR camera image 1130 as described above with respect to FIGS. 8-10 before purchasing the virtual digital object 1110.

Figure 12:
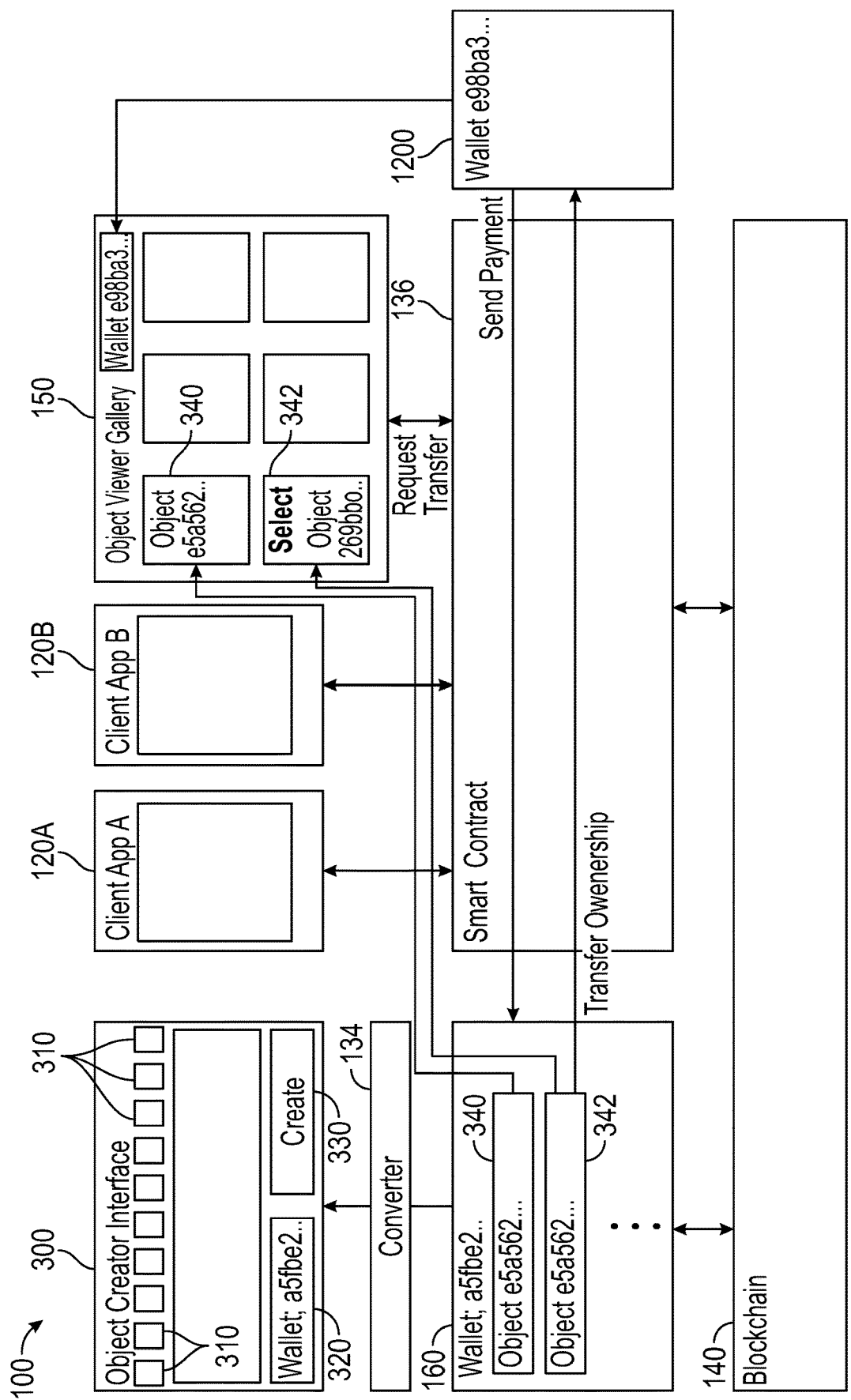
FIG. 12 illustrates a functional block overview of a system for purchasing and transmitting a virtual digital object in a sample configuration.

FIG. 12 illustrates a functional block overview of system 100 for transmitting and purchasing a virtual digital object 340 in a sample configuration. As illustrated, the user may elect to transfer one or both of stored virtual digital objects 340, 342 to the virtual digital object gallery 150 for review by other users for purchase. Upon selection of a virtual digital object for purchase (e.g., virtual digital object 342 as illustrated in FIG. 12), a transfer request is provided to the smart contract 136. If the transfer fits the purchase criteria of the smart contract 136, the smart contract 136 authorizes payment from the purchaser's digital wallet 1200 and authorizes transfer of the payment to the seller's digital wallet 160 in a manner consistent with the requirements of the smart contract 136. Upon confirmation of payment transfer, the smart contract 136 transfers ownership of the purchased virtual digital object from the seller's digital wallet 160 to the buyer's digital wallet 1200 and updates the metadata as appropriate to reflect the updated ownership.

Figure 13:
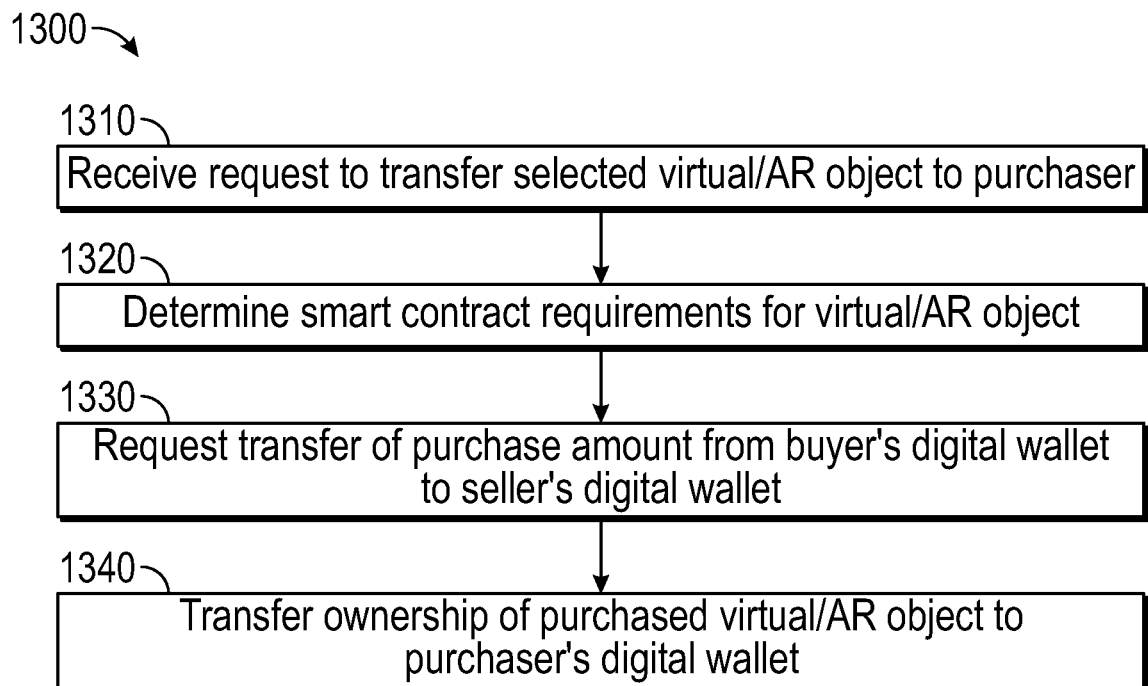
FIG. 13 illustrates a flow chart for purchasing and transmitting a virtual digital object using the gallery view software of the user's mobile phone.

FIG. 13 illustrates a flow chart 1300 for transmitting and purchasing a virtual digital object using the gallery view software 515 of the user's mobile phone 120. Upon selection of a virtual digital object (e.g., virtual digital object 342) from the gallery 150, a transfer request is received by the smart contract 136 at 1310. The requirements for purchasing the virtual digital object are determined at 1320, and the purchase amount is provided to the buyer's digital wallet 1200 to initiate the payment transfer to the seller's digital wallet 160 at 1330. Upon confirmation of payment, the ownership of the selected virtual digital object 342 is transferred to the buyer by updating the metadata of the smart contract 136 and transferring the digital file to the buyer's digital wallet 1200 at 1340. The smart contract 136 updates the metadata as appropriate to reflect the updated ownership.

To purchase or generate virtual digital objects using the system described herein, a user first obtains a digital wallet including at least one of cryptocurrency or a crypto checking account. Commonly used Ethereum wallets include MetaMask, Ledger Nano X, and Coinbase Wallet. The user may load the digital wallet by converting real-world cash into cryptocurrency (such as Ether) to pay the transaction fees to generate the virtual digital object as described herein. The digital wallet is then connected to the gallery 150 for purchases and to the virtual object creator/editor 132 for the creation of virtual digital objects. It will be appreciated that the gallery 150 may include features shared by existing NFT platforms such as Nifty Gateway, OpenSea, and SuperRare. The user may upload the virtual digital objects to the gallery 150 in the same way that NFT images, GIFs, audio files or 3-D models are uploaded to the NFT platforms. The uploaded virtual digital objects may be digitally signed to establish authenticity. In some configurations, a fee may be charged to mint the virtual digital object and to upload a virtual digital object to the gallery 150. Such fees may be pulled from the user's digital wallet 160 based on terms of sale set in the smart contract 136.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 14:
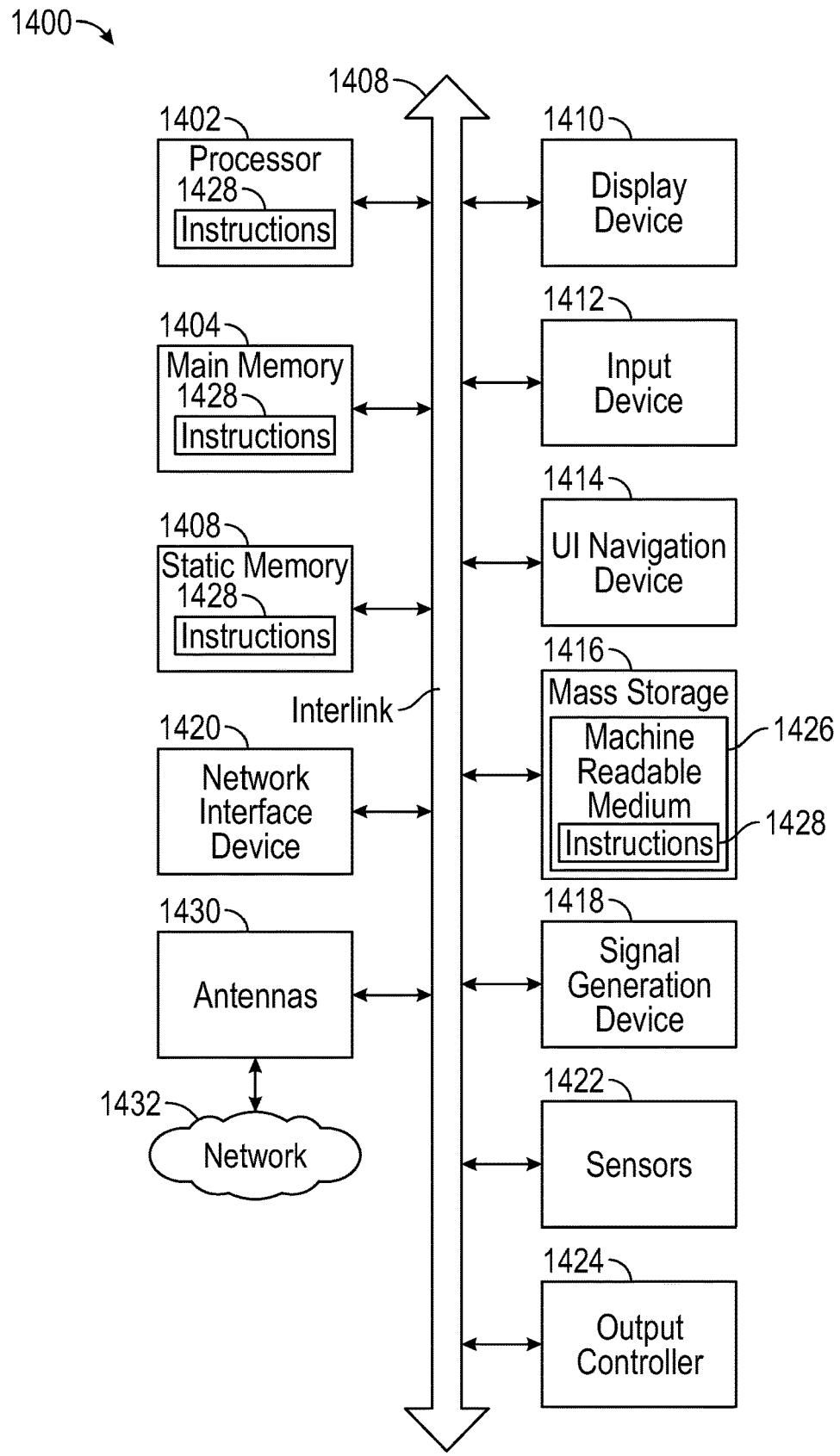
FIG. 14 illustrates a sample configuration of a computer system adapted to implement the systems and methods described herein.

FIG. 14 illustrates a sample configuration of a computer system adapted to implement the systems and methods described herein. In particular, FIG. 14 illustrates a block diagram of an example of a machine 1400 upon which one or more configurations may be implemented. In alternative configurations, the machine 1400 may operate as a stand-alone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. In sample configurations, the machine 1400 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1400 may serve as a workstation, a front-end server, or a back-end server of a communication system. Machine 1400 may implement the methods described herein by running the software used to implement the virtual digital objects generated as described herein. Further, while only a single machine 1400 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410 (shown as a video display), an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a mass storage device (e.g., drive unit) 1416, a signal generation device 1418 (e.g., a speaker), a network interface device 1420, and one or more sensors 1422. Example sensors 1422 include one or more of a global positioning system (GPS) sensor, compass, accelerometer, temperature, light, camera, video camera, sensors of physical states or positions, pressure sensors, fingerprint sensors, retina scanners, or other sensors. The machine 1400 may include an output controller 1424, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The mass storage device 1416 may include a machine readable medium 1426 on which is stored one or more sets of data structures or instructions 1428 (e.g., software) embodying or utilized by any one or more of the techniques or functions described herein. The instructions 1428 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the mass storage device 1416 may constitute machine readable media.

While the machine readable medium 1426 is illustrated as a single medium, the term "machine readable medium" may include a single medium or multiple media (e.g., at least one of a centralized or distributed database, or associated caches and servers) configured to store the one or more instructions 1428. The term "machine readable medium" may include any medium that is capable of storing, encoding, or carrying instructions for execution by the machine 1400 and that cause the machine 1400 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM (compact disc read only memory) and DVD-ROM disks. In some examples, machine readable media may include non-transitory machine-readable media. In some examples, machine readable media may include machine readable media that is not a transitory propagating signal.

The instructions 1428 may further be transmitted or received over communications network 1432 using a transmission medium via the network interface device 1420. The machine 1400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS (Plain Old Telephone Service)) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas 1430 to connect to the communications network 1432. In an example, the network interface device 1420 may include a plurality of antennas 1430 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 130 or host computer of the service provider into the computer platforms of the client devices 120. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD (Digital Versatile Disk) or DVD-ROM, any other optical medium, punch cards paper tape, any other physical storage medium with patterns of holes, a RAM, a PROM (Programmable Read Only Memory) and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of creating and viewing a virtual digital object having a value designated in cryptocurrency, comprising:
    enabling a first user to create the virtual digital object through selection of predetermined digital components having respective values designated in cryptocurrency and established using one or more smart contracts, to track a history of actions by the first user in designing and generating the created virtual digital object, and to update a cost tally of the predetermined digital components used in creating the created virtual digital object designated in cryptocurrency, the predetermined digital components being paid for from a digital wallet of the first user, wherein the created virtual digital object comprises metadata including identification of the first user, the history of actions by the first user in designing and generating the created virtual digital object, and the value of the created virtual digital object designated in cryptocurrency based at least on the updated cost tally of the predetermined digital components used in creating the created virtual digital object;
    enabling the first user to add the created virtual digital object to at least one of the first user's digital wallet or an online gallery;
    receiving from the first user or a second user a selection of at least one of an avatar, a captured image of the first user, second user or a third party, or a digital scene;
    receiving from the first user or second user a selection of the created virtual digital object from the first user's digital wallet or the online gallery for display on at least one of the avatar, the captured image of the first user, second user or the third party, or within the digital scene;
    displaying the selected virtual digital object in a display including at least one of the avatar, the captured image of the first user, second user or the third party, or the digital scene;
    enabling the first user or second user to manipulate the displayed virtual digital object within the display;
    displaying at least part of the metadata along with the displayed virtual digital object; and
    enabling the second user to purchase the selected created virtual digital object from the online gallery by receiving a transfer request to a smart contract from the second user, authorizing transfer of a purchase price of the created virtual digital object in cryptocurrency from the second user to the first user's digital wallet, and updating metadata of the smart contract to transfer ownership of the selected created virtual digital object from the first user to the second user.

2. The method of claim 1, wherein receiving from the first user or second user a selection of the created virtual digital object for display comprises enabling the first user or second user to select the created virtual digital object from a gallery of virtual digital objects maintained by the first user or second user.

3. The method of claim 1, wherein receiving from the first user or second user a selection of the created virtual digital object for display comprises enabling the second user to select the created virtual digital object from the online gallery.

4. The method of claim 1, further comprising capturing an image of the selected created virtual digital object in the display including the at least one of the avatar, the captured image of the first user, second user or the third party, or the digital scene and forwarding the captured image via a messaging or social media application.

5. The method of claim 1, wherein the created virtual digital object comprises at least one of virtual digital jewelry or virtual digital art comprising at least one of a virtual painting, a virtual sculpture, a virtual document, or a virtual diploma adapted to be placed in a virtual environment within the display.

6. The method of claim 1, wherein the metadata comprises at least one of a name of a creator of the created virtual digital object, a number of hours spent making the created virtual digital object, or at least one of an online or geographic location of where the creator was during creation of the created virtual digital object.

7. The method of claim 1, wherein displaying the selected created virtual digital object in the display further comprises enabling the first user or second user to view the created virtual digital object and the metadata of the created virtual digital object in an augmented reality camera view of the first user, second user or the third party.

8. A system for creating and viewing a virtual digital object having a value designated in cryptocurrency, comprising:
a display;
a memory that stores instructions; and
a processor that executes the instructions stored in the memory to enable creating and viewing a virtual digital object by:
enabling a first user to create the virtual digital object through selection of predetermined digital components having respective values designated in cryptocurrency and established using one or more smart contracts, to track a history of actions by the first user in designing and generating the created virtual digital object, and to update a cost tally of the predetermined digital components used in creating the created virtual digital object designated in cryptocurrency, the predetermined digital components being paid for from a digital wallet of the first user, wherein the created virtual digital object comprises metadata including identification of the first user, the history of actions by the first user in designing and generating the created virtual digital object, and the value of the created virtual digital object designated in cryptocurrency based at least on the updated cost tally of the predetermined digital components used in creating the created virtual digital object;
enabling the first user to add the created virtual digital object to at least one of the first user's digital wallet or an online gallery;
receiving from the first user or a second user a selection of at least one of an avatar, a captured image of the first user, second user or a third party, or a digital scene;
receiving from the first user or second user a selection of the created virtual digital object from the first user's digital wallet or the online gallery for display on at least one of the avatar, the captured image of the first user, second user or the third party, or within the digital scene;
displaying the selected virtual digital object in a display including at least one of the avatar, the captured image of the first user, second user or the third party, or the digital scene;
enabling the first user or second user to manipulate the displayed virtual digital object within the display;
displaying at least part of the metadata along with the displayed virtual digital object; and
enabling the second user to purchase the selected created virtual digital object from the online gallery by receiving a transfer request to a smart contract from the second user, authorizing transfer of a purchase price of the created virtual digital object in cryptocurrency from the second user to the first user's digital wallet, and updating metadata of the smart contract to transfer ownership of the selected created virtual digital object from the first user to the second user.

9. The system of claim 8, wherein the instructions for receiving from the first user or second user a selection of the created virtual digital object for display comprise instructions that, when executed by the processor, enable the first user or second user to select the created virtual digital object from a gallery of virtual digital objects maintained by the first user or second user.

10. The system of claim 8, wherein the instructions for receiving from the first user or second user a selection of the created virtual digital object for display comprise instructions that, when executed by the processor, enable the second user to select the created virtual digital object from the online gallery for viewing.

11. The system of claim 8, wherein the instructions further comprise instructions that, when executed by the processor, enable capturing of an image of the selected created virtual digital object in the display including the at least one of the avatar, the captured image of the first user, second user or the third party, or the digital scene and forwarding the captured image via a messaging or social media application.

12. The system of claim 8, wherein the created virtual digital object comprises at least one of virtual digital jewelry or virtual digital art comprising at least one of a virtual painting, a virtual sculpture, a virtual document, or a virtual diploma adapted to be placed in a virtual environment within the display.

13. The system of claim 8, wherein the metadata comprises at least one of a name of a creator of the created virtual digital object, a number of hours spent making the created virtual digital object, or at least one of an online or geographic location of where the creator was during creation of the created virtual digital object.

14. The system of claim 8, further comprising an augmented reality camera, wherein displaying the selected created virtual digital object in the display further comprises enabling the first user or second user to view the created virtual digital object and the metadata of the created virtual digital object in an augmented reality camera view of the first user, second user or the third party as taken by the augmented reality camera.

15. A non-transitory computer readable medium having stored thereon instructions, wherein execution of the instructions of the non-transitory computer readable medium configures a user device to create and display a virtual digital object having a value designated in cryptocurrency, by performing steps including:
enabling a first user to create the virtual digital object through selection of predetermined digital components having respective values designated in cryptocurrency and established using one or more smart contracts, to track a history of actions by the first user in designing and generating the created virtual digital object, and to update a cost tally of the predetermined digital components used in creating the created virtual digital object designated in cryptocurrency, the predetermined digital components being paid for from a digital wallet of the first user, wherein the created virtual digital object comprises metadata including identification of the first user, the history of actions by the first user in designing and generating the created virtual digital object, and the value of the created virtual digital object designated in cryptocurrency based at least on the updated cost tally of the predetermined digital components used in creating the created virtual digital object;

enabling the first user to add the created virtual digital object to at least one of the first user's digital wallet or an online gallery;

receiving from the first user or a second user a selection of at least one of an avatar, a captured image of the first user, second user or a third party, or a digital scene;

receiving from the first user or second user a selection of the created virtual digital object from the first user's digital wallet or the online gallery for display on at least one of the avatar, the captured image of the first user, second user or the third party, or within the digital scene;

displaying the selected virtual digital object in a display including at least one of the avatar, the captured image of the first user, second user or the third party, or the digital scene;

enabling the first user or second user to manipulate the displayed virtual digital object within the display;

displaying at least part of the metadata along with the displayed virtual digital object; and enabling the second user to purchase the selected created virtual digital object from the online gallery by receiving a transfer request to a smart contract from the second user, authorizing transfer of a purchase price of the created virtual digital object in cryptocurrency from the second user to the first user's digital wallet, and updating metadata of the smart contract to transfer ownership of the selected created virtual digital object from the first user to the second user.

16. The medium of claim 15, wherein the instructions for receiving from the first user or second user a selection of the created virtual digital object for display comprise instructions that, when executed, enable the first user or second user to select the created virtual digital object from a gallery of virtual digital objects maintained by the first user or second user or from the online gallery.

17. The medium of claim 15, wherein the instructions further comprise instructions that, when executed, enable capturing an image of the selected created virtual digital object in the display including the at least one of the avatar, the captured image of the first user, second user or the third party, or the digital scene and forwarding the captured image via a messaging or social media application.

18. The medium of claim 15, wherein the created virtual digital object comprises at least one of virtual digital jewelry or virtual digital art comprising at least one of a virtual painting, a virtual sculpture, a virtual document, or a virtual diploma adapted to be placed in a virtual environment within the display, and the metadata comprises at least one of a name of a creator of the created virtual digital object, a number of hours spent making the created virtual digital object, or at least one of an online or geographic location of where the creator was during creation of the created virtual digital object.

* * * * *